Patented Aug. 14, 1934

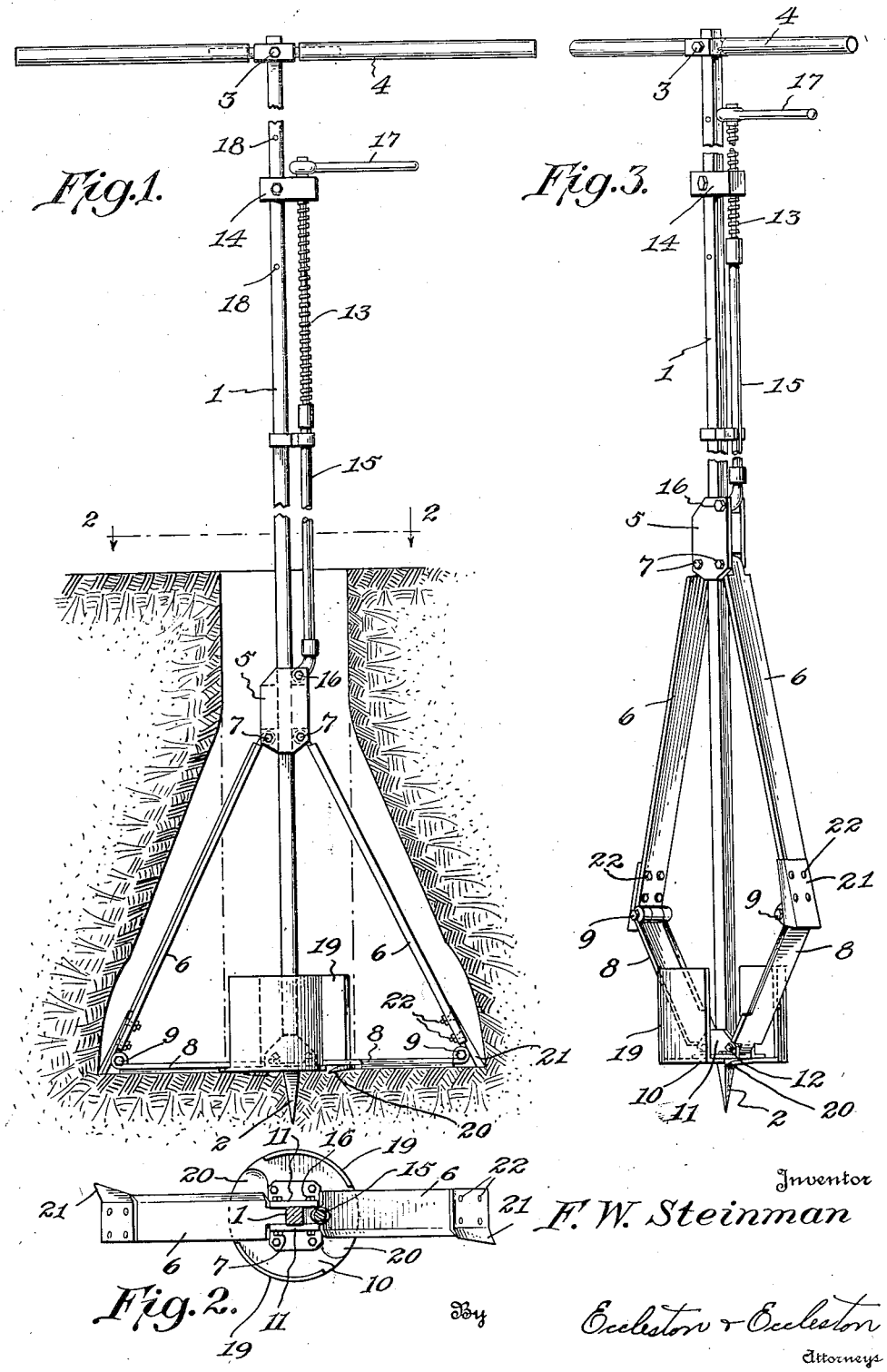

1,970,063

UNITED STATES PATENT OFFICE 1,970,063

UNDERREAMER

Frederick W. Steinman, Beaumont, Tex.

Application April 24, 1933, Serial No. 667,704

6 Claims. (Cl. 255—74)

This invention relates to underreamers for enlarging the bottom portion of holes made in the ground for the reception of piers or the like thereby increasing the bearing surface with a minimum excavation of earth. It will be understood however, that the invention is adaptable for use wherever excavations are to be enlarged at the bottom.

One of the objects of the invention resides in the provision of a mechanically or manually operable reamer in which mechanical means are provided for gradually expanding the cutting blades to final position.

A further object of the invention consists in providing detachably mounted cutting blades whereby blades of different lengths may be employed depending upon the area desired in the particular excavation.

Another object of the invention resides in the provision of detachable, auxiliary blades for use with the main blades when hard soil is encountered.

Other objects and advantages of the invention will be apparent from the following description when taken in connection with the accompanying drawing, in which Figure 1 is a side elevational view of the apparatus in use.

Figure 2 is a horizontal sectional view taken on line 2—2 of Figure 1, and,

Figure 3 is a view similar to Figure 1 showing the blades partly collapsed.

Referring to the drawing in greater detail the numeral 1 indicates a rod or shaft preferably of rectangular cross-section and provided with a sharpened lower end 2 to enter the ground at the bottom of the hole and form a bearing for reamer. Secured to the upper end of the rod 1, by a set screw 3 or otherwise, is a cross-bar or handle 4 for rotating as well as lowering and raising the apparatus.

Slidably mounted on the rod 1 is a bearing member 5 to the lower end of which are pivoted two cutting blades 6. These blades are detachably connected to the bearing member by bolts 7 and hence may be readily detached if blades of different lengths are to be substituted or for repair. Pivotally connected to the lower ends of the blades 6 is a second pair of blades 8; detachable bolts 9 serving as the pivots. The opposite ends of the blades 8 are pivotally connected to the upper surface of a disc 10.

The disc 10 is fixed to the rod 1 just above its sharpened lower end 2 and serves as a stop to limit the downward movement of the rod 1 into the ground at the base of the hole. A pair of spaced brackets 11 are fixed to the disc 10, being disposed on opposite sides of the rod 1 and in contact therewith. These brackets serve not only as a reinforcement for the connection between the rod 1 and disc 10, but also as pivots for the lower or inner ends of the blades 8. Detachable bolts 12 span the space between the brackets 11 and pass through hinge knuckles formed on the inner ends of the blades. Inasmuch as the connections for the blades 8 are detachable it will be apparent that blades of different lengths may be readily substituted depending upon the amount of bearing surface required for a particular pier or pillar.

As already indicated the blades 6—8 are intended to be expanded and contracted in use, and for this purpose means is provided for raising and lowering the slidable bearing member 5. The means disclosed in the present embodiment of the invention consists of a feed screw 13 which is threaded through a nut carried by a bracket 14. The lower end of the screw 13 is swivelled to a connecting rod 15 which has its lower end pivoted to the upper end of bearing 5 as indicated by bolt 16. The upper end of the feed screw 13 is of polygonal shape for the reception of a wrench 17 having a head of similar shape and by means of which the screw is rotated to either raise or lower the bearing 5 and consequently to collapse or expand the cutting blades 6—8.

As previously pointed out, blades of different lengths may be employed depending upon the required diameter of the enlarged portion of the excavation, and obviously it is necessary that the other parts of the apparatus be adjustable to conform to the different blades used. To this end the rod 1 is provided with a series of vertically spaced openings 18 adapted to receive the securing means for bracket 14. In this way the position of the slide bearing 5 is adjusted to suit the length of blades required for the particular work at hand.

The disc 10 is preferably provided with a pair of arcuate side walls 19 spaced apart sufficiently to provide passages for the blades 8. These walls form a receptacle for the cuttings from the underreamer and also provide a brace for the blades 8 as will be clearly seen upon examination of Figures 2 and 3.

The disc 10 is also preferably provided with bent down portions 20 which are sharpened for cutting. This is to gather into the receptacle any loose dirt that has fallen to the bottom of the excavation.

When the apparatus is used in hard ground it is sometimes difficult for the joints of the blades to penetrate the side walls of the excavation and in order to obviate this difficulty, supplemental blades 21 are bolted to blades 6 by means of bolts 22. These blades 21 serve to penetrate the side walls of the preliminary excavation and permit the proper expansion of the blades to enlarge the cavity.

In the operation of the device, blades of the proper length to provide the desired bearing surface for the foundation are connected to the slide bearing 5 and to the brackets 11. The bracket 14 is then adjusted to the proper opening 18 and secured in place. The feed screw 13 is rotated to collapse the blades and the apparatus is then lowered into the excavation. The feed screw 13 is now rotated by wrench 17 to expand the blades against the wall of the cavity and the apparatus rotated by handles 4, or from any source of power, to cause the blades to under-cut the walls. When the receptacle 19 is filled with cuttings the blades are collapsed and the apparatus withdrawn and the cuttings removed. These steps are continued until the excavation is completed as indicated in Figure 1.

From the above description taken in connection with the accompanying drawing it will be apparent that I have devised an underreamer in which blades of various lengths may be easily installed so as to produce bearing surfaces of the desired area; that the expansion of the blades to the required degree may be readily accomplished from time to time by merely turning a feed screw; that adjustments are provided for conforming the feed screw mechanism to different lengths of blades; that auxiliary blades are provided for adapting the device to hard soil; and that the entire apparatus is strong and durable throughout.

In accordance with the patent statutes I have described what I now believe to be the preferred form of construction but various modifications may be made in the detailed structure without departing from the spirit of the invention and all such changes are to be included within the scope of the appended claims.

What I claim is:

1. An underreamer including a rod, a disc fixed adjacent the lower end thereof, a bearing slidably mounted on the rod, means for raising and lowering the bearing, a pair of cutting blades having their upper ends pivoted to the bearing, a second pair of cutting blades pivoted to the respective ends of the first pair of blades, said second pair of blades having their opposite ends pivoted to the disc and being normally in substantial alignment with the first-mentioned pair of blades.

2. An underreamer including a rod, a disc fixed adjacent the lower end thereof, a bearing slidably mounted on the rod, a feed screw carried by the rod and connected to the bearing for raising and lowering the same, a pair of cutting blades having their upper ends pivoted to the bearing, a second pair of cutting blades pivoted to the respective end of the first pair of blades, said second pair of blades having their opposite ends pivoted to the disc and being normally in substantial alignment with the first-mentioned pair of blades.

3. An underreamer including a rod, a disc fixed adjacent the lower end thereof, a pair of spaced, arcuate walls fixed to the periphery of the disc, a bearing slidably mounted on the rod, means for raising and lowering the bearing, a pair of cutting blades having their upper ends pivoted to the bearing, a second pair of cutting blades pivoted to the respective ends of the first pair of blades, said second pair of blades being normally in substantial alignment with the first-mentioned pair of blades and extending through the spaces formed between the arcuate walls and having their ends pivoted to the disc.

4. An underreamer including a rod, a disc fixed adjacent the lower end thereof, a pair of spaced arcuate walls fixed to said disc and extending upwardly therefrom to form a receptacle, a bearing slidably mounted on the rod, means for raising and lowering the bearing, a pair of cutting blades having their upper ends pivoted to the bearing, a second pair of cutting blades pivoted to the respective ends of the first pair of blades and normally in substantial alignment therewith, said second pair of blades having their opposite ends pivoted to the disc.

5. An underreamer including a rod, a disc fixed adjacent the lower end thereof, cutting edges formed on the disc, a bearing slidably mounted on the rod, means for raising and lowering the bearing, a pair of cutting blades having their upper ends pivoted to the bearing, a second pair of cutting blades pivoted to the respective ends of the first pair of blades, said second pair of blades having their opposite ends pivoted to the disc.

6. An underreamer including a rod, a disc fixed adjacent the lower end thereof, a bearing slidably mounted on the rod, means for raising and lowering the bearing, a pair of cutting blades having their upper ends attached to the bearing, a second pair of cutting blades pivoted to the respective ends of the first pair of blades, said second pair of blades having their opposite ends pivoted to the disc and being normally in substantial alignment with the first-mentioned pair of blades, and auxiliary blades rigidly connected to the first-mentioned blades and extending beyond the pivot points of the pivotally connected blades.

FREDERICK W. STEINMAN.